US012329203B2

(12) United States Patent
Bessant et al.

(10) Patent No.: US 12,329,203 B2
(45) Date of Patent: Jun. 17, 2025

(54) ELECTRONIC AEROSOL-GENERATING SMOKING DEVICE

(71) Applicant: Altria Client Services LLC, Richmond, VA (US)

(72) Inventors: Michel Bessant, Carouge (CH); Fabien Duc, Neuchatel (CH)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 160 days.

(21) Appl. No.: 17/980,719

(22) Filed: Nov. 4, 2022

(65) Prior Publication Data

US 2023/0053993 A1 Feb. 23, 2023

Related U.S. Application Data

(63) Continuation of application No. 16/941,019, filed on Jul. 28, 2020, now Pat. No. 11,559,083, which is a (Continued)

(30) Foreign Application Priority Data

Sep. 15, 2016 (EP) .................................... 16189009

(51) Int. Cl.
*A24F 47/00* (2020.01)
*A24F 40/40* (2020.01)
(Continued)

(52) U.S. Cl.
CPC .............. *A24F 40/46* (2020.01); *A24F 40/40* (2020.01); *A24F 40/42* (2020.01); *A24F 40/485* (2020.01);
(Continued)

(58) Field of Classification Search
CPC ........... A24F 40/20; A24F 40/40; A24F 40/46
See application file for complete search history.

(56) References Cited

U.S. PATENT DOCUMENTS

| | | | |
|---|---|---|---|
| 5,069,230 | A | 12/1991 | Green |
| 2008/0092912 | A1 | 4/2008 | Robinson et al. |

(Continued)

FOREIGN PATENT DOCUMENTS

| | | | |
|---|---|---|---|
| AU | 2012342570 | A1 | 7/2014 |
| CN | 1905858 | A | 1/2007 |

(Continued)

OTHER PUBLICATIONS

Chinese Office Action for Application No. 202111494553.3, dated Dec. 12, 2023, with English Translation included.

(Continued)

*Primary Examiner* — Eric Yaary
(74) *Attorney, Agent, or Firm* — Harness, Dickey & Pierce, P.L.C.

(57) ABSTRACT

An electronic aerosol-generating smoking device includes a main body having a heating region for heating aerosol-forming substrate. The main body includes a front housing defining a cavity configured to receive an aerosol-forming substrate, and a heater in the main body and configured to heat the aerosol-forming substrate in the cavity. At least a portion of an internal surface of the main body is at least one of a hydrophobic and super-hydrophobic surface.

18 Claims, 1 Drawing Sheet

Related U.S. Application Data continuation of application No. 15/787,975, filed on Oct. 19, 2017, now Pat. No. 10,757,978, which is a continuation of application No. PCT/EP2017/071928, filed on Aug. 31, 2017.

(51) Int. Cl.

| | |
|---|---|
| ***A24F 40/42*** | (2020.01) |
| ***A24F 40/46*** | (2020.01) |
| ***A24F 40/485*** | (2020.01) |
| ***H05B 3/46*** | (2006.01) |
| *A24F 40/10* | (2020.01) |
| *A24F 40/20* | (2020.01) |

(52) U.S. Cl.

CPC ................ *H05B 3/46* (2013.01); *A24F 40/10* (2020.01); *A24F 40/20* (2020.01)

(56) References Cited

U.S. PATENT DOCUMENTS

| | | | | |
|---|---|---|---|---|
| 2009/0242036 | A1 | 10/2009 | Kolodner et al. | |
| 2010/0028604 | A1 | 2/2010 | Bhushan et al. | |
| 2011/0155153 | A1 | 6/2011 | Thorens et al. | |
| 2014/0041655 | A1 | 2/2014 | Barron et al. | |
| 2014/0305449 | A1* | 10/2014 | Plojoux | A24F 40/46 131/328 |
| 2015/0013439 | A1 | 1/2015 | Davis et al. | |
| 2015/0013696 | A1 | 1/2015 | Plojoux et al. | |
| 2015/0150302 | A1* | 6/2015 | Metrangolo | A24C 5/18 131/230 |
| 2015/0163859 | A1 | 6/2015 | Schneider et al. | |
| 2015/0201674 | A1 | 7/2015 | Dooly et al. | |
| 2016/0271347 | A1 | 9/2016 | Raichman | |
| 2017/0020312 | A1 | 1/2017 | Davis et al. | |
| 2017/0273356 | A1 | 9/2017 | Sebastian et al. | |
| 2024/0206538 | A1* | 6/2024 | Park | A24F 40/44 |

FOREIGN PATENT DOCUMENTS

| | | | |
|---|---|---|---|
| CN | 202311184 | U | 7/2012 |
| CN | 103997922 | A | 8/2014 |
| CN | 104906669 | A | 9/2015 |
| CN | 204796740 | U | 11/2015 |
| CN | 204837995 | U | 12/2015 |
| CN | 105377062 | A | 3/2016 |
| CN | 105873460 | A | 8/2016 |
| DE | 20114878 | U1 | 3/2002 |
| EP | 2460422 | A1 | 6/2012 |
| JP | 11-510074 | A | 9/1999 |
| JP | 2014-533513 | A | 12/2014 |
| KR | 10-2010-0092013 | A | 8/2010 |
| KR | 101614774 | B1 | 4/2016 |
| NZ | 593272 | A | 2/2013 |
| RU | 2014125232 | A | 12/2015 |
| WO | WO-9704827 | A1 | 2/1997 |
| WO | 2011/117580 | A2 | 9/2011 |
| WO | WO-2013/076098 | A2 | 5/2013 |
| WO | WO-2014102092 | A1 | 7/2014 |
| WO | 2015/008253 | A1 | 1/2015 |
| WO | WO-2015/177304 | A2 | 11/2015 |
| WO | WO-2016/007817 | A1 | 1/2016 |

OTHER PUBLICATIONS

Korean Office Action for corresponding Application No. 10-2019-7004989, dated Oct. 27, 2022, English translation included.

Korean Office Action for corresponding Application No. 10-2019-7004989, dated Sep. 20, 2023, English translation included.

European Search Report for European Patent Application 16189009.0 Dated Mar. 27, 2017.

International Search Report and Written Opinion dated Nov. 6, 2017.

Yang, Y. et al., "A Low-Cost and Flexible Microplasma Generation Device to Create Hydrophobic/Hydrophilic Contrast on Nonflat Surfaces," Journal of Microelectromechanical Systems, vol. 24, No. 6, pp. 1678-1680, Dec. 2015.

Chen, L. et al., "Fabrication of 3D polymer microstructures using electron beam lithography and nanoimprinting technologies," http://iopscience.iop.org/article/10.1088/0960-1317/15/10/015/meta, Aug. 19, 2005.

Ahmmed, K.M. et al., "Fabrication of Micro/Nano Structures on Metals by Femtosecond Laser Micromachining," Micromachines 2014, 00, 1219-1253, Nov. 20, 2014.

https://www.futura-sciences.com/sciences/actualites/physique-plus-hydrophobe-feuille-lotus-grace-plante-carnivore-5966/, Sep. 7, 2015.

https://en.wikipedia.org/wiki/Ultrahydrophobicity, Aug. 16, 2018.

https://en.wikipedia.org/wiki/Superhydrophobic_coating, Aug. 16, 2018.

https://en.wikipedia.org/wiki/Shot_peening, Aug. 16, 2018.

http://www.wpctreatment.com/about.htm, Aug. 16, 2018.

https://en.wikipedia.org/wiki/Nanoimprint_lithography, Aug. 16, 2018.

"*Surface wettability, hydrophobic surface*" from the book: Les nanotechnologies, concepts et applications, by Pierre Camille Lacaze, edition Germes Lavoisier. pp. 106-109, 2013.

Russian Notice of Allowance and Search Report and English translation thereof dated Dec. 11, 2020.

Chinese First Office Action and English translation included herewith dated Apr. 26, 2021.

Japanese Office Action for corresponding Application No. 2019-513049, dated Aug. 11, 2021.

English translation of Japanese Office Action for corresponding Application No. 2019-513049, dated Aug. 11, 2021.

Chinese Notice of Allowance for corresponding Application No. 201780051534.9, dated Sep. 28, 2021.

Japanese Office Action for corresponding Application No. 2019-513049, dated Jun. 8, 2022.

Korean Office Action for corresponding Application No. 10-2019-7004989, dated Apr. 18, 2023, English translation included.

Korean Office Action for Application No. 10-2023-7028158, dated Sep. 25, 2024, with English Translation.

* cited by examiner

ELECTRONIC AEROSOL-GENERATING SMOKING DEVICE

CROSS-REFERENCE TO RELATED APPLICATIONS

This is a continuation of and hereby claims priority under 35 U.S.C. § 120/121 to U.S. application Ser. No. 16/941,019 filed Jul. 28, 2020, which is a continuation of U.S. application Ser. No. 15/787,975 filed Oct. 19, 2017 which is a continuation of international application no. PCT/EP2017/071928, filed on Aug. 31, 2017, which claims priority to European Patent Application No. 16189009.0, filed on Sep. 15, 2016, each of which are hereby incorporated by reference in their entirety.

BACKGROUND

At least some example embodiments relate to electronic aerosol-generating smoking devices.

Various aerosol-generating systems are known, wherein an aerosol-forming substrate is heated in order to vaporize substances from the substrate forming an inhalable aerosol. In some systems a tobacco material plug is heated by a heater blade inserted into the plug.

SUMMARY

Residues left on the blade as well as deposits in a flow path may influence a smoking experience. In addition, cleaning of device parts is often difficult.

There is need for aerosol-generating devices reducing the amount of residues, in particular reducing the requirement of cleaning device parts subject to aerosol-forming substrate or components thereof.

According to at least some example embodiments, there is provided an electronic aerosol-generating smoking device. The electronic smoking device comprises a main body including a heating region for heating aerosol-forming substrate, wherein at least portions of internal surface of the main body is at least one of a hydrophobic and super-hydrophobic surface.

An electronic aerosol-generating smoking device according to an example embodiment may comprise a main body comprising a heating region for aerosol-forming substrate, wherein the main body comprises a cavity for receiving an aerosol-forming substrate and a heater arranged in the main body and adapted for heating aerosol-forming substrate accommodated in the cavity. At least a portion of an internal surface of the main body defining the cavity in the heating region may be a hydrophobic or super-hydrophobic surface.

In an example embodiment, the heater is a heater blade extending into the cavity, the heater blade comprising at least one of a hydrophobic and a super-hydrophobic outer surface.

In an example embodiment, the device further includes a tubular-shaped extractor in the heating region, wherein an inner surface and an outer surface of the extractor includes the at least one of the hydrophobic and the super-hydrophobic surface.

In an example embodiment, the main body includes a proximal end, and an air flow conduit leading from the heating region to the proximal end of the main body, at least a portion of the air flow conduit includes the at least one of the hydrophobic and the super-hydrophobic surface.

In an example embodiment, the air flow conduit comprises an aerosolization chamber arranged downstream of the heating region, the aerosolization chamber comprising at least one of a hydrophobic and a super-hydrophobic inner surface.

In an example embodiment, the device further includes a mouthpiece including a flow channel, wherein a downstream end of the flow channel is an outlet opening in a proximal end of the mouthpiece, the flow channel in the mouthpiece including the at least one of the hydrophobic and the super-hydrophobic surface.

In an example embodiment, the main body includes: a reservoir for holding an aerosol-forming substrate, wherein an outer surface of the reservoir is provided with the at least one of the hydrophobic and the super-hydrophobic surface.

In an example embodiment, the at least one of the hydrophobic and the super-hydrophobic surface is a hydrophobic or super-hydrophobic coating applied to at least the portion of the internal surface of the main body.

In an example embodiment, the hydrophobic coating includes silane, fluorocarbon, fluorinated compounds or acrylic acid and is non-polar.

In an example embodiment, the super-hydrophobic coating comprises manganese oxide polystyrene nanocomposite, zinc oxide polystyrene nanocomposite, precipitate calcium carbonate, carbon nanotubes or a silica nanocoating.

In an example embodiment, the at least one of the hydrophobic and the super-hydrophobic surface is at least one of a micro-structured and a nano-structured surface.

In an example embodiment, the super-hydrophobic surface is a combination of a micro-structured and a nano-structured surface.

In an example embodiment, the at least one of the micro-structured and the nano-structured surface is manufactured by micro-shot peening, femtosecond laser machining, microplasma treatment, photolithography or nanoimprinting lithography.

In an example embodiment, at least one of a hydrophobic and a super-hydrophobic coating is applied to at least one of a micro-structured and a nano-structured surface.

BRIEF DESCRIPTION OF THE DRAWINGS

Example embodiments are further described below, some of which are illustrated by means of the following drawings, wherein.

DETAILED DESCRIPTION

Figure 1:
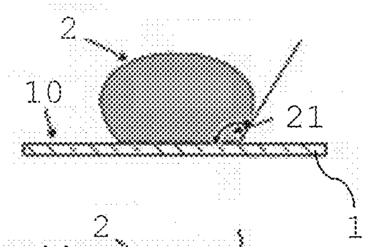
FIGS. 1 and 2 show hydrophobicity and hydrophilicity of a surface according to an example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Surfaces of components that come in contact with aerosol or residues of aerosol or of a heated aerosol-forming substrate during a use may be contaminated with these substances.

With the provision of hydrophobic, preferably super-hydrophobic, surfaces, formation of residues and condensation on these surfaces may be prevented or reduced. Cleaning of these parts of the aerosol-generating device may accordingly be omitted or reduced. In addition, cleaning is facilitated since contaminants from hydrophobic or super-hydrophobic surfaces in general come off relatively easier.

In particular in electronic smoking devices comprising a heater blade and an extractor part where a tobacco containing aerosol-forming substrate is inserted into the device, cleaning may become a challenge, for example due to the fragility or limited accessibility of the elements.

Absence or a reduced presence of residues and by-products of the heating and aerosol-formation process in, for example, a flow conduit at or downstream of a heating region may also lead to an improved smoking experience and a more reliable and repeatable smoking experience. With a contaminant-free heater that is in direct contact with aerosol or aerosol-forming substrate, the performance of the heater or of a given operation mode of the heater may be maintained.

The flow conduit is herein understood to include any surfaces in the aerosol-generating device that come into contact with substances of the heated aerosol-forming substrate. Thus, it includes any surface inside the device coming into contact with aerosol or with the heated aerosol-forming substrate and is typically arranged at and downstream of the heating region. The flow conduit may in particular include but is not limited to: a heating region or parts of the heating region; a flow conduit in a mouthpiece; surfaces defining a cavity for receiving an aerosol-forming substrate, for example a tobacco plug of an aerosol-generating article; an outer cartridge surface, which cartridge contains the aerosol-forming substrate, which cartridge may for example be an integral part of the device or a non-replaceable or also a refillable cartridge.

A hydrophobic or super-hydrophobic surface may be a hydrophobic or super-hydrophobic coating applied to at least portions of inner surfaces of a main body in the heating region or downstream of the heating region. For example, a hydrophobic or super-hydrophobic coating may be applied to an inner surface of an air flow conduit, to at least portions of an outer surface of a heater or to inner surfaces defining a cavity in the main body for receiving a aerosol-forming substrate, for example a heat stick or a tobacco plug. A hydrophobic or super-hydrophobic coating may be applied to surfaces of parts of an existing device, for example, to improve its cleaning properties.

A hydrophobic coating may, for example, be non-polar comprising silane, fluorocarbon, fluorinated compounds or acrylic acid. A non-polar or apolar coating or surface is defined by the absence of any localized electrical load.

A super-hydrophobic coating may, for example, comprise manganese oxide polystyrene nanocomposite, zinc oxide polystyrene nanocomposite, precipitate calcium carbonate, carbon nanotubes or may be a silica nano coating.

Hydrophobic coatings are selected in view of stability of the coating to reduce/eliminate degradation of the coating in function of the temperature and chemical interaction with for example tobacco, nicotine based liquid and the aerosol generated in the device.

Coatings may be applied to an underlying base material by methods known in the art for deposition of thin films. Chemical or physical deposition methods may be used. For example, a hydrophobic material may directly be sprayed on a surface of a material to be coated or dip coating of the material to be coated may be performed. More durable surface treatments are, for example, physical vapour deposition (PVD), chemical vapour deposition (CVD), sol-gel processes and other deposition processes suitable for thin-film coating.

A hydrophobic or super-hydrophobic surface may also be a micro-structured or a nano-structured surface.

A super-hydrophobic surface may be a combined micro-structured and nano-structured surface. For example, micro structures of a micro-structured surface may be provided with nano-structures.

Micro-structured surfaces may have structure sizes in a range between 1 micrometer and several hundred micrometers, between 1 and 200 micrometers, or between 1 and 100 micrometer.

Nano-structured surfaces may have structure sizes of ten or a few hundred nanometers. Nanostructures of nano-structured surfaces have sizes of, for example, between 10 nm and 800 nm, between 50 nm and 500 nm, or between 100 nm and 300 nm.

A hydrophobic or super-hydrophobic coating may be applied to a micro-structured or nano-structured surface or to a micro-structured and nano-structured surface.

A hydrophobic or super-hydrophobic coating applied to a micro- or nano-structured surface may be any one of the hydrophobic or super-hydrophobic coatings mentioned above.

A micro- or nanostructure may be provided to a hydrophobic or super-hydrophobic coating.

By a combination of structure and coating, physical properties of the structured surface may be combined with chemical properties of the coating. A hydrophobic or super-hydrophobic effect may thus be enhanced or adapted to specific substances to be repelled from the respective surfaces. For example, a surface may be adapted to be super-hydrophobic for a specific aerosol droplet size or specific viscosity of an aerosol-forming liquid to be aerosolized.

Chemical properties of coatings may be enhanced when a micro- or nanostructure of the surface is created. A micro- or nano-structuration created on a surface may be related to a droplet size. For example, a super-hydrophobic surface may be achieved by dispersing artificial asperities of micrometric sizes on a hydrophobic surface. Ultra-hydrophobicity is reached, when a liquid droplet rests on the top of such asperities.

Hydrophobicity or hydrophilicity of a surface is defined by the contact angle θ between a droplet and a flat solid surface the droplet is arranged on. The contact angle is a measure of the wettability of the surface by the droplet.

A hydrophobic surface has a contact angle θ larger than 90 degree. A contact angle θ of hydrophobic surfaces is typically between 90 degree and 120 degree (a droplet beads up). A contact angle of about 90 degree is a desired contact angle for water on a surface, indicating that the surface is water-repellent, but will still clean with water.

Super-hydrophobic surfaces are characterized by a large contact angle and are difficult to wet with water.

A super-hydrophobic surface has a contact angle of larger than 150 degree. A contact angle θ of super-hydrophobic surfaces are typically between 150 degree and 180 degree (a droplet is highly beaded).

Contrary to hydrophobicity, on a hydrophilic surface a water droplet spreads out far and the contact angle θ is very small. On these surfaces, the water droplets do not roll, but glide.

As used herein, the term ‘droplet size’ is used to mean the aerodynamic droplet size, which is the size of a spherical unit density droplet that settles with the same velocity as the droplet in question. Several measures are used in the art to describe aerosol droplet size. These include mass median diameter (MMD) and mass median aerodynamic diameter (MMAD). As used herein, the term ‘mass median diameter (MMD)’ is used to mean the diameter of a droplet such that half the mass of the aerosol is contained in small diameter droplets and half in large diameter droplets. As used herein, the term ‘mass median aerodynamic diameter (MMAD)’ is used to mean the diameter of a sphere of unit density that has the same aerodynamic properties as a droplet of median mass from the aerosol.

The mass median aerodynamic diameter (MMAD) of the droplets generated by the smoking device of example embodiments may be between about 0.1 μm and about 10 μm, or the MMAD may be between about 0.5 μm and about 5 μm, for example between 0.5 μm and 3 μm such as between 0.8 μm and 1.2 μm. The MMAD of the droplets may be equal to or less than 2.5 μm. The desired droplet size of the droplets generated by the smoking device of example embodiments may be any MMAD described above. The desired droplet size (MMAD) may be equal to or less than 2.5 μm.

Preferably, an aerosol-forming liquid used for aerosol generation in the smoking device according to example embodiments has a viscosity in a range between 1 mPas and 200 mPas, or between 1 mPas and 150 mPas, for example between 80 mPas and 130 mPas.

Micro-structured or nano-structured surfaces may be manufactured by methods known in the art for manufacturing nano-structured and micro-structured surfaces. Micro-structured or nano-structured surfaces may, for example, be manufactured by micro-shot peening, femtosecond laser machining, microplasma treatment, photolithography or nanoimprinting lithography.

Micro-shot peening is a cold working process modifying the mechanical properties of a surface, for example a metal or composite surface. In micro-shot peening, a surface is impacted with shot (round particles, for example made of glass, metal of ceramic material) sufficient to create plastic deformation. Thereby, each particle functions as a ball-peen hammer such that the surface is plastically deformed (contrary to sand-blasting where abrasion takes place). Micro-shot peening is favourable in manufacturing random surface structures, for example, providing a surface with micro-dimples. Compared to conventional shot-peening in micro-shot peening smaller shot dimensions and higher shot velocity is used. Structures on a given surface material and geometry may be achieved by selection of the shot material and size, shot intensity and coverage. For micro-shot peening typical shot sizes of between 0.03 mm to 0.5 mm are used. For surface treatment of surfaces in smoking devices, preferably, shot comprising of particles having sizes of about 0.03 mm in diameter are used.

With femtosecond laser, micro- and nanostructures may be performed in one step. This method is basically suitable for all materials and is scalable to a desired structure size and structure pattern to be achieved. Random structures are available as well as periodic structures. In particular, nano-structures of a few tenths or a few hundred nanometers, for example, 100 nm to 300 nm, or down to 10 nm are available with femtosecond laser treatment. The method is contactless and, does not need to be, but may be performed in special atmospheres. Microstructures generated by femtosecond laser treatment are preferably in a lower micrometer range, typically in the range of 1 micrometer to 20 micrometer.

Microstructures may be provided with sub-micron and smaller microstructures or nanostructures, respectively.

Microplasma treatment compared to conventional plasma treatment has the advantage of being limited in dimensions of the plasma, ranging from tens to thousands of micrometers.

Plasma treatment of a surface not only allows to deposit or etch a material but also to activate or chemically alter a surface. Thus, microplasma treatment allows to provide a structure to a surface and hydrophobization of specific materials may be achieved. For example, a hydrophobic fluorocarbon polymers pattern may be provided on a glass substrate.

Photolithography is a well known process, for example, in wafer structuration and will not further be described. Nano-imprinting lithography (NIL) is a similar process. A resist on a substrate is provided with a desired structure by a structured stamp. The structured resist may be etched and cured to achieve the final structure. Instead of a resist, a molding material may directly be provided with a structure of a stamp. Due to the nature of polymer-to-polymer contact printing in lithography, the elastic constitution of the material allows for the manufacture of microstructures of about 1 micrometer depending on the material. For example, amorphous metal, nanostructures of about 20 to 100 nanometers may be provided.

Advantageously, a hydrophobic or super-hydrophobic surface in the device according to example embodiments, in particular surfaces of an airflow conduit, comprise a hydrophobic or super-hydrophobic surface designed for the above-mentioned aerosol droplet sizes.

Depending on the set-up of the device and the way the aerosol-forming substrate is provided, for example using a liquid aerosol-forming reservoir or a solid tobacco material, different parts of the device or of the flow conduit come into contact with the heated aerosol-forming substrate, aerosol or other evaporated or non-evaporated substances from the aerosol-forming substrate. Thus, different parts and elements of these devices may be provided with a hydrophobic or super-hydrophobic surface.

A device may comprise a compartment for holding an aerosol-forming substrate. Such a compartment may directly receive a solid aerosol-forming substrate or may receive or contain a cartridge or reservoir. If in direct contact with aerosol-forming substrate or forming part of an airflow conduit guiding evaporated substances to a mouth end of the device, inner compartment walls are may be hydrophobic or super-hydrophobic surfaces.

For example, in devices for use together with a heat stick, which typically comprises an aerosol-forming substrate containing a tobacco plug, the main body comprises a cavity for receiving an aerosol-forming substrate to be heated in the cavity or also for receiving a cartridge to be inserted into the cavity. Cavities in main bodies for receiving an aerosol-generating substrate are typically in direct contact with the substrate, in particular with the portion of the substrate that is heated (also referred to as "heated substrate") and as such comprise a hydrophobic or super-hydrophobic inner surface defining the cavity. Such cavities may be more easily cleaned before a new aerosol-forming substrate is inserted into the cavity.

A device for being used with a heat stick further comprises a heater arranged in the main body. The heater is adapted for heating an aerosol-forming substrate accommodated in the cavity. In these devices, at least portions of surfaces defining the cavity or of the heater are a hydrophobic or super-hydrophobic surface.

In resistively heatable devices, the heater may be a heater blade extending into the cavity. A heat stick may be introduced with its aerosol-forming substrate containing end or tobacco end, into the cavity of the device and is thereby pushed over the heater blade. To support consistent heating and smoking conditions for each new heat stick, the heater blade may comprise a hydrophobic or super-hydrophobic outer surface.

The cavity or main body device walls in the heating region surrounding the cavity may be formed by one or preferably several elements. These elements not only define the cavity for the aerosol-forming substrate but may also define an air flow path inside the main body from the environment to the heated aerosol-forming substrate. The inside of the cavity and such an external air flow path may be in fluid connection with each other such that evaporated substances might pass from the cavity into the external air flow path and be deposited therein.

For example, the heating region may comprise a tubular-shaped extractor, wherein an inner surface and an outer surface of the extractor is a hydrophobic or super-hydrophobic surface. The inner surface of the extractor thereby substantially defines the size of the cavity.

In devices where an aerosol-forming substrate is provided in liquid form or liquid containing form, such as for example in a cartridge or a tank system, the set-up of the device is different and a user draws on a mouthpiece of the device.

In such example embodiments of electronic smoking devices, the main body comprises a proximal end and comprises an air flow conduit leading from the heating region to the proximal end of the main body inside the main body. At least portions of the air flow conduit may comprise a hydrophobic or super-hydrophobic surface. A heater for heating the aerosol-forming substrate may be part of the device and accordingly also comprise a hydrophobic or super-hydrophobic surface. However, the heater may also be integral with, for example, a cartridge. In systems where a cartridge is reusable, comprising a heater or not, an outside of the cartridge may comprise a hydrophobic or super-hydrophobic surface.

The main body of the device may also comprise a reservoir for holding an aerosol-forming substrate. An outer surface of such a reservoir or cartridge may be provided with a hydrophobic or super-hydrophobic surface. For example. this measure may be used if the reservoir is an integrated reservoir or reusable reservoir or also generally a refillable reservoir in the form of a cartridge or tank. Although reusable cartridges are often individual and removable parts independent of the device, with hydrophobic outer surfaces, cleaning of these cartridges before reuse may be omitted or simplified.

Electronic smoking devices may comprise an aerosolization chamber where substances evaporated from the aerosol-forming substrate may, for example, cool down and form an aerosol. An aerosolization chamber may be arranged downstream of the heating region and also downstream of a heater, independent of the way of heating the aerosol-forming substrate or in what state and form the substrate is provided.

In example embodiments of the device comprising an aerosolization chamber arranged downstream of the heating region, for example where a flow conduit comprises an aerosolization chamber, the aerosolization chamber comprises a hydrophobic or super-hydrophobic inner surface.

Heaters may be in direct contact with an aerosol-forming substrate or may be mounted, for example, in a device housing, thus protected by housing walls. Heaters may be a part of the device or may be part of a cartridge. Heaters may be resistive or inductive heaters.

In devices comprising a heater which is in direct contact with aerosol-forming substrate, the surface of the heater is provided with a hydrophobic or super-hydrophobic surface, for example, a heater that is not a replaceable heater such as a heater which is part of a disposable cartridge. In devices comprising a heater, for example in the form of a fluid permeable flat mesh heater or in the form of a heater blade, the mesh heater or the heater blade preferably comprises a hydrophobic or super-hydrophobic outer surface. For example, a glass blade and an aerosolization chamber made of glass may comprise hydrophobic or super-hydrophobic surfaces.

An aerosol-generating device may further comprise a mouthpiece, wherein a portion of the flow conduit, a most downstream portion of the flow conduit, is arranged in the mouthpiece.

'Upstream' and 'downstream' is herein seen in view of a flow direction of air entering the device, passing through the device and leaving the device. An outlet opening of the device is a most downstream location in a device where an air flow, comprising or not comprising aerosol, leaves the device.

The flow conduit of a device may be comprised of one or several individual, separate or intertwined flow channels.

The device according to example embodiments may comprise a mouthpiece comprising at least a flow channel arranged in the mouthpiece. A downstream end of the flow channel corresponds to an outlet opening in the proximal end of the mouthpiece. The flow channel in the mouthpiece may comprise a hydrophobic or super-hydrophobic surface.

Figure 2:
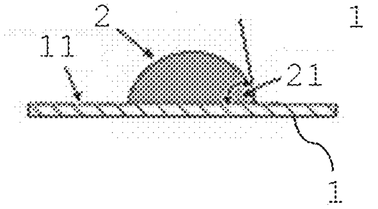

FIG. 1 and FIG. 2 show examples of a droplet behaviour on a hydrophobic and a hydrophilic surface. The main method for distinguishing between hydrophobic and hydrophilic surfaces 10,11 is the contact angle 21. This refers to the angle 21 that a droplet of fluid, here an aerosol droplet 2, makes at the point of contact with the surface of a rigid substrate 1. For a hydrophobic surface 10 as shown in FIG. 1, the contact angle 21 is always larger than 90 degrees, and it can be as high as 150 degrees. At contact angles above 150 degree a surface is called super-hydrophobic. Hydrophilic surfaces 11 as shown in FIG. 2 always have contact angles less than 90 degrees and usually less than 50 degree.

Figure 3:
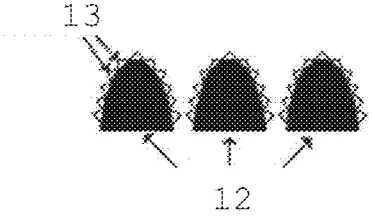
FIG. 3 shows a hydrophobic nano- and microstructured surface according to an example embodiment.

In FIG. 3 an example of a combined micro- and nano-structure is shown. The microstructures 12 are in the form of domes 12, which may be regularly or irregularly arranged on a surface. The microstructures 12 itself are provided with nanostructures 13 shown as a plurality of pyramids on the surfaces of the microstructures 12. Super-hydrophobicity is available when an aerosol droplet 2 remains on top of the nanostructures 13.

Figure 4:
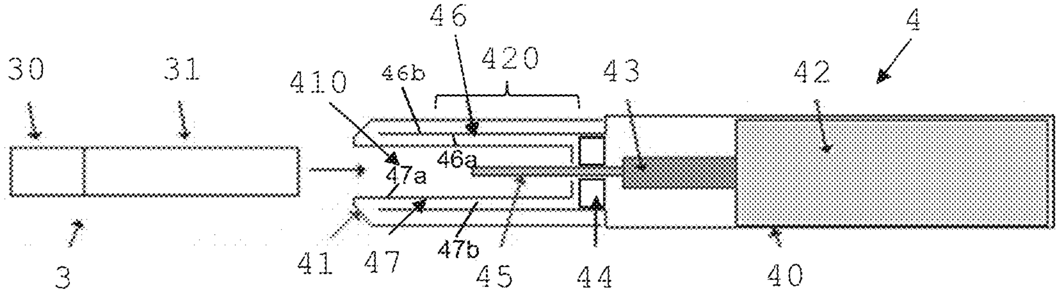
FIG. 4 is a schematic cross section of an electronic smoking device using a heater blade for heating a tobacco plug of an aerosol-generating article according to an example embodiment.

FIG. 4 is an example of an electronic smoking device 4 for a heat stick 3. The heat stick 3 is an aerosol-generating article in the form of a tobacco stick and includes a mouth portion 30 and a tobacco portion 31. The mouth portion 30 comprises, for example, a filter segment. The tobacco portion 31 may comprise a tobacco plug, for example, a crimped and gathered cast leaf (a form of reconstituted tobacco that is formed from a slurry including tobacco particles, fiber particles, aerosol former, binder and for example also flavours). The heat stick 3 is inserted into a cavity 410 in a front housing portion 41 of the device 4. At least the mouth portion 30 of the heat stick 3 extends from the front housing portion when the stick 3 is accommodated in the cavity 410. In use, a user draws on the mouth portion 30 of the heat stick 3 for drawing aerosol and other substances from the heated tobacco stick through the stick to the mouth portion 30.

The front housing portion 41 is basically formed by an extractor 47 and a middle part 46, the latter for example being made of aluminium. A heater blade 45 for heating the tobacco extends into the cavity 410 and is pushed into the tobacco portion 31 of the heat stick 3 upon insertion of the heat stick 3 into the cavity 410 of the device 4. The region where the front housing portion 47 surrounds the heater blade and an aerosol-forming substrate when present in the cavity basically forms a heating region 420 of the device. In a radial extension, the heating region 420 extends up to the inner side of the front housing portion's 41 outer wall.

A distal housing portion 40 comprises a battery 42 and electronics, for example an electronic control board 43, connected to the heater blade 45 for heating the heater blade and controlling a heating process. A thermal insulation, for example a heater overmould 44, is arranged between cavity 410 and distal housing portion 40 for separating the heating region 420 from the distal housing portion 40. Heater overmould 44 directly forms the bottom of the cavity 410.

The parts of the front housing portion 41, that is, the extractor 47 and the middle part 46, as well as the heater blade 45 and the heater overmould 44 are provided with a hydrophobic or a super-hydrophobic surface. These may be nanostructured surfaces, micro-structured surfaces, hydrophobic or super-hydrophobic coatings or a combination thereof.

Preferably, the extractor 47 and middle part 46 are provided with a hydrophobic surface on all sides, at least inner sides 46*a*, 47*a* and outer sides 46*b*,47*b* of the middle part 46 and the extractor 47, respectively. The heater overmold 44 may be provided with a hydrophobic surface only on that side forming part of the cavity 410. The heater blade 45 is provided with a hydrophobic surface at least on the two largest sides exposed to the cavity 410, and preferably also on the small sides.

The extractor 47 and middle part 46 have a basically tubular shape. However, the extractor 47 may also include several protrusions and indentations and a middle part is provided with several openings for an airflow to be able to pass through. Thus, these parts are either in direct contact with the tobacco portion or may come in contact with substances from the heated tobacco substrate or with both and are thus prone to capture residues on their surfaces. In addition, their shape and fragility provide limited accessibility and stability in view of cleaning. Since the smoking device 4 is made for repeated use, reducing accumulation of contaminants and residues on the parts coming in direct contact with substances from the heated tobacco substrate of the heat stick 3, handling, performance and a user experience may be enhanced by the provision of hydrophobic surfaces of these parts of the device.

Figure 5:
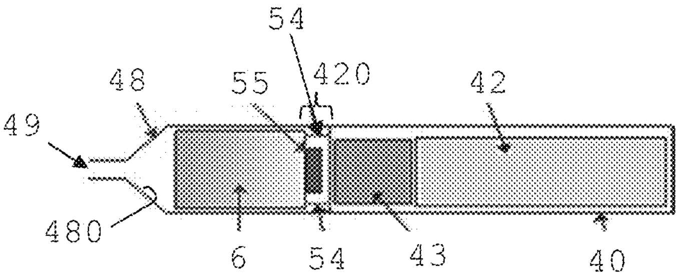
FIG. 5 shows an electronic smoking device comprising a liquid containing reservoir according to an example embodiment.

In FIG. 5 an example of an electronic smoking device using a liquid reservoir or tank 6 is shown. The liquid aerosol-forming substrate in the tank 6 is heated and aerosolized by a heater 55, for example a heater coil around a wick element or a fluid permeable flat heater. The heater 55 is arranged adjacent to the tank 6. Laterally next to the heater 55, electrical contacts 54 are provided to supply power from the battery 42 to the heater 55. The battery 42 and electronics, for example an electronic control board 43 are arranged in a distal housing portion 40.

A heating region 420' in the embodiment shown in FIG. 5 has a rather small extension in a longitudinal direction of the device and is in this longitudinal direction basically limited to the region between open end of the tank 6 and the size of the heater. In a radial extension the heating region 420' extends up to the inner side wall of the main body.

The proximal end of the device and a most downstream element of the device housing is formed by a mouthpiece 48. In the mouthpiece 48 the aerosol from the heated liquid is collected and may leave the mouthpiece 48 via outlet 49. In these devices a user draws on the mouthpiece of the device.

Aerosol generated at the location of the heater 55 passes between tank 6 and housing wall downstream to the mouthpiece 48 and to the outlet 49. Thus, surfaces of parts and elements on this path are preferably all hydrophobic surfaces or super-hydrophobic surfaces.

The heater 55, the internal housing wall arranged next to the tank 6, internal surfaces 480 of the mouthpiece 48 as well as the outer surface of the tank 6 are hydrophobic or super-hydrophobic surfaces.

In the embodiment shown in FIG. 5 the mouthpiece comprises a cavity forming an aerosolization chamber arranged downstream of the tank 6.

The tank 6 may be an integrated tank or may be a replaceable and/or a refillable tank 6.

It will be understood that mentioning the provision of a hydrophobic surface also includes the possibility of providing a super-hydrophobic surface. In view of reduced contaminations and simplified cleaning properties super-hydrophobic surfaces may be preferred. However, depending on a material used or for example cost constraints, different processes for making a surface hydrophobic or super-hydrophobic may be chosen.

The invention claimed is:

1. An electronic aerosol-generating device comprising:
- a front housing defining a cavity, the front housing including,
  - an extractor,
  - an air flow conduit,
  - a middle portion including a plurality of openings for an airflow to be able to pass through, the middle portion being discrete from the extractor,
  - a heater overmould arranged at a distal end of the front housing, and
  - a heating region within at least a portion of the cavity, the heating region including a heater blade; and
- a distal housing opposite the front housing,
- wherein at least a portion of an internal surface of the front housing defining the cavity, the extractor, the air flow conduit, the middle portion, and the heating region include a hydrophobic surface, a super-hydrophobic surface, or both a hydrophobic surface and a super-hydrophobic surface, and the heater blade is configured to extend through the heater overmould to couple to an electronic control board of the electronic aerosol-generating device.

2. The electronic aerosol-generating device of claim 1, wherein the heater blade is configured to extend into the cavity, the heater blade including a hydrophobic or super-hydrophobic outer surface.

3. The electronic aerosol-generating device of claim 2, wherein the super-hydrophobic outer surface includes a micro-structured surface and a nano-structured surface.

4. The electronic aerosol-generating device of claim 1, wherein the air flow conduit extends from the heating region to a proximal end of the front housing.

5. The electronic aerosol-generating device of claim 1, wherein the air flow conduit comprises an aerosolization chamber adjacent a proximal end of the front housing opposite the heating region, the aerosolization chamber comprising a hydrophobic or super-hydrophobic inner surface.

6. The electronic aerosol-generating device of claim 1, further comprising a mouthpiece including a flow channel, a downstream end of the flow channel is an outlet opening in a proximal end of the mouthpiece, the flow channel in the mouthpiece includes a hydrophobic surface, a super-hydrophobic surface, or both a hydrophobic surface and a super-hydrophobic surface.

7. The electronic aerosol-generating device of claim 1, where the hydrophobic surface is non-polar comprising silane, fluorocarbon, fluorinated compounds or acrylic acid.

8. The electronic aerosol-generating device of claim 1, where the super-hydrophobic surface comprises manganese oxide polystyrene nanocomposite, zinc oxide polystyrene nanocomposite, precipitate calcium carbonate, carbon nanotubes or is a silica nanocoating.

9. The electronic aerosol-generating device of claim 1, wherein the hydrophobic surface or the super-hydrophobic surface is a micro-structured or nano-structured surface.

10. The electronic aerosol-generating device of claim 9, wherein the micro-structured or nano-structured surface is manufactured by micro-shot peening, femtosecond laser machining, microplasma treatment, photolithography or nanoimprinting lithography.

11. The electronic aerosol-generating device of claim 9, wherein a hydrophobic or super-hydrophobic coating is applied to a micro-structured or nano-structured surface.

12. The electronic aerosol-generating device of claim 1, wherein the super-hydrophobic surface is a combination of a micro-structured and nano-structured surface.

13. The electronic aerosol-generating device of claim 12, wherein the micro-structured or nano-structured surface is manufactured by micro-shot peening, femtosecond laser machining, microplasma treatment, photolithography or nanoimprinting lithography.

14. The electronic aerosol-generating device of claim 3, wherein a hydrophobic or super-hydrophobic coating is applied to a micro-structured or nano-structured surface.

15. The electronic aerosol-generating device of claim 1, wherein the extractor is tubular-shaped.

16. The electronic aerosol-generating device of claim 1, wherein the heater overmould is arranged at a distal end of the front housing to separate the heating region from the distal housing.

17. The electronic aerosol-generating device of claim 16, wherein the heater overmould includes a hydrophobic surface, a super-hydrophobic surface, or both a hydrophobic surface and a super-hydrophobic surface.

18. The electronic aerosol-generating device of claim 1, wherein the distal housing includes a battery and a controller.

* * * * *